UNITED STATES PATENT OFFICE.

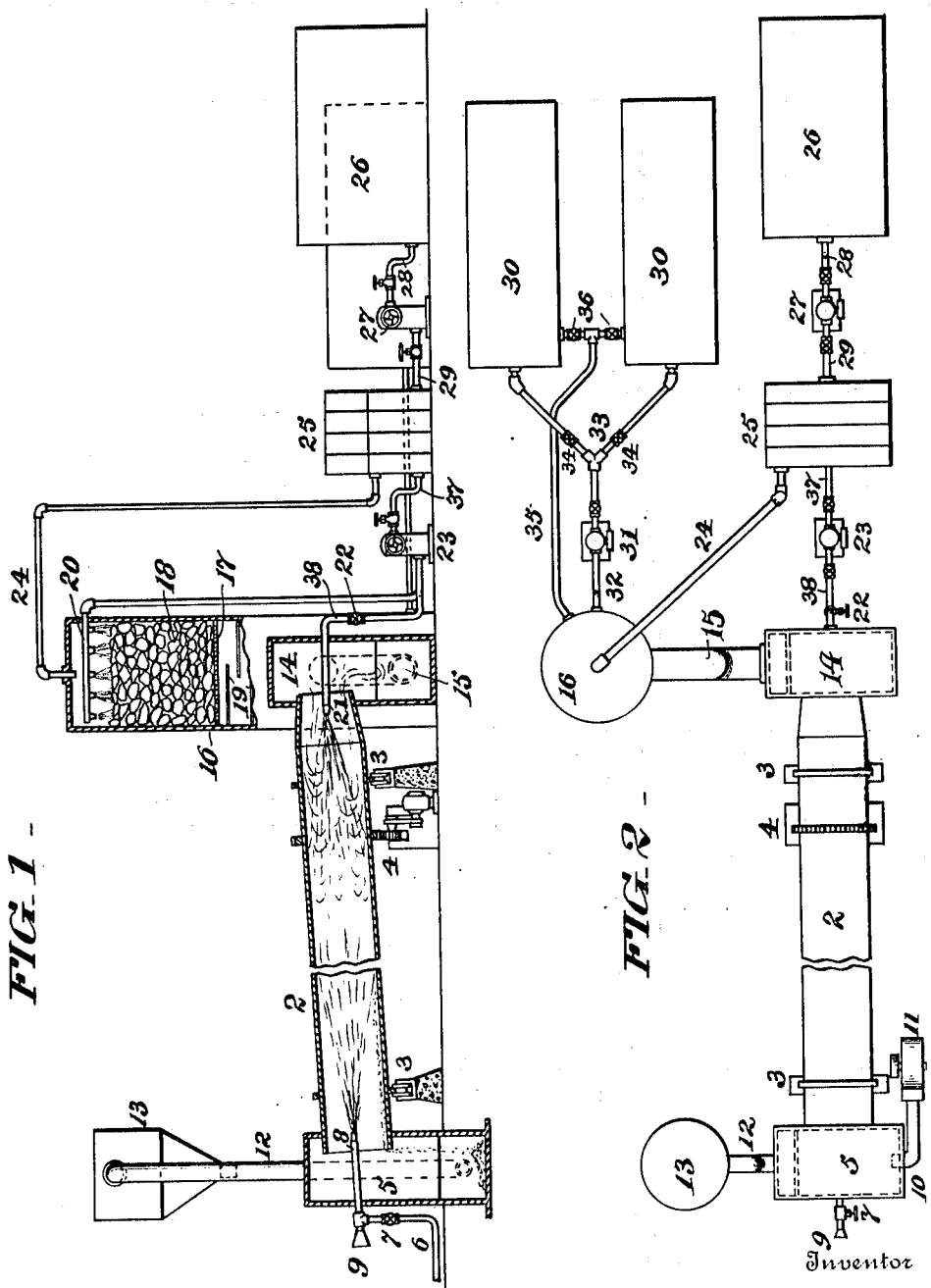

CHARLES A. WEEKS, OF PHILADELPHIA, PENNSYLVANIA.

RECOVERY OF SULFURIC ACID AND IRON OXID FROM FERROUS-SULFATE SLUDGE.

1,048,247.  Specification of Letters Patent.  Patented Dec. 24, 1912.

Application filed July 25, 1911. Serial No. 640,471.

*To all whom it may concern:*

Be it known that I, CHARLES A. WEEKS, a citizen of the United States, and a resident of Philadelphia, county of Philadelphia, State of Pennsylvania, have invented an Improvement in Recovery of Sulfuric Acid and Iron Oxid from Ferrous-Sulfate Sludge, of which the following is a specification.

My invention has reference to processes for recovery of sulfuric acid and iron oxid from ferrous sulfate sludge and consists of certain improvements hereinafter fully set forth.

In carrying my invention into practice, I may employ a solution of ferrous sulfate sludge when evaporated, or ferrous sulfate crystals (copperas) and as a matter of economy I prefer to use ferrous sulfate solution when evaporated to a degree near the crystallizing stage, at which point in concentration the concentrated liquor can be sprayed; and the said ferrous sulfate solution is sprayed into the upper end of a heated, slightly inclined rotating tubular furnace, said furnace being heated by a jet of gas and air, or other carbonaceous fuel, admitted to the lower end of the furnace, the ferrous sulfate being gradually heated within the furnace until the greatest temperature zone is reached, at which the calcination of the ferrous sulfate crystals takes place with the result that ferrous oxid is formed and the whole contents of sulfur gases with other vapors are released; the ferric oxid is discharged from the lower end of the rotating furnace, while the sulfur gases and other vapors pass from the highest end of the furnace where the temperature zone is cool and is delivered into condensing tower where it is subjected to treatment of a spray of weak solution of sulfuric acid, which condenses and absorbs the contained sulfuric acid gas, the other gas passing on; the absorbed sulfuric acid gas being withdrawn from the condensing tower and stored or used over again; and the ferric oxid is collected from the lower end of the furnace, cooled and recovered as ferric oxid free from sulfur owing to the sulfur and other gases, being driven off during the process of production.

The foregoing statement of the nature of my invention sets out in a general way the operation for the conversion of ferrous sulfate into ferric oxid and sulfur gases and the subsequent absorption of the sulfuric acid gas by the weak solution of sulfuric acid, thereby providing two commercial products of recovery from the ferrous sulfate solution, but these improvements will now be more fully described as to each operation in connection with the apparatus employed and disclosed in the accompanying drawings, in which:—

Figure 1 is an elevation of a suitable apparatus, with part in section, in which to carry out my improved process; and Fig. 2 is a plan view of the same.

2 is a rotating furnace of any suitable construction; as shown being made tubular, set on an incline and open at each end. This furnace is supported on rollers 3 and may be rotated by suitable power devices 4. The lower end of the furnace opens into an oxid collecting chamber 5 from which the oxid dust and gases may be led by a pipe 12 to an oxid dust collector 13 and from which the gases may escape. A blower 11 may deliver a blast of air through pipe 10 into the chamber 5 for assisting in oxidizing the ferrous oxid and forcing the ferric oxid so formed, together with ferric oxid passing from the furnace, into the collector 13.

8 is a nozzle for combustive material extending through the chamber 5 into the lower end of the furnace 2 and may be supplied with gas or oil from a pipe 6 having a control valve 7 and air by the inlet 9. The gas jet produced in this manner is forced into the lower end of the furnace producing the hottest zone approximately in the middle of the length of the furnace. Any other manner of producing heat in the furnace may be employed, if so desired. The other or upper end of the furnace 2 opens into a dust chamber 14 having a lateral outlet or flue 15 leading to the condensing tower 16. This condensing and concentrating tower is provided with a spray pipe 20 at its top for spraying a weak solution of sulfuric acid, and may have a filling of quartz 18 supported upon a grating 17 if so desired. The tower may also be provided with terra cotta or refractory baffle plates 19 to cause a sinuous passage of the gases upward through sheets of dripping solution passing down through the tower. The solution from the bottom of the tower 16 flows by pipe 35 to the tanks 30, communication from the said pipe to either tank being had by valves 36. The weak solution of sulfuric acid from these tanks is pumped by pump 31 through pipe 32 to the spray pipe 20 in the top of the tower. The pump 31 may draw its supply from either tank by the pipes 33 under the control of the valves 34.

21 is a nozzle extending into the upper end of the furnace for spraying ferrous sulfate solution into the same in a direction opposite to the heating jet from nozzle 8 at the opposite end of the furnace. The solution is forced from this nozzle 21 by a pump 23 having its pressure side connected with the nozzle by a pipe 38 having a control valve 22. The suction side of the pump may lead directly from the solution tank 26 or more preferably from the last effect of a multiple effect evaporating apparatus 25, with which its suction pipe 37 connects. In this case the solution is sucked from the tank 26, through pipe 28 by a pump 27 and supplied by a pipe 29 to the first effect of the multiple effect evaporating apparatus 25. The heat for the first effect of the multiple effect evaporating apparatus may be provided by the hot escaping gases from the tower 16, which escape at the top and may be conveyed by pipe 24 to the said first effect.

The concentrating multiple effect evaporating apparatus may be substituted by any suitable evaporating apparatus of less complication if so desired; and so far as my process may be considered the ferrous sulfate solution may be prepared as a preliminary operation and fed to the pump 23 direct from the tank 26 in which it is stored.

The ferrous sulfate solution is sprayed into the heated furnace 2 and caused to meet the oppositely flowing heating gases in the zone of the greatest heat (preferably about 1400° F. H.), said heat gradually decreasing toward the discharge end, namely the end in which the solution is delivered. In this way the ferrous sulfate crystals of the solution spray are subjected to a gradual preheating and fractional distillation on their way to the zone of greatest temperature where they are completely calcined and the entire sulfate anhydrid and other vapor released. The time period of this fractional distillation of the sulfur gases and the calcination of the crystals, may be varied by increasing or diminishing the speed at which the furnace is rotated or by varying the temperature of the furnace or by both of these actions. The released sulfur gases and other vapors pass into the dust chamber 14 and thence to the condensing tower 16 where the contained sulfuric anhydrid is caused to be absorbed and concentrated by the spray of weak sulfuric acid solution as before described.

The calcined sulfate leaves a residue of ferric oxid, due to the fact that during the distillation of the sulfur gases, the ferrous oxid of the ferrous sulfate becomes oxidized in the oxidizing atmosphere of the furnace and travels by gravity out of the calcining zone to the discharge end of the furnace, and while still in the heated condition it may be met by an air blast in the chamber 5 from pipe 10 which further oxidizes any ferrous oxid still remaining and at the same time cools the product. This same blast of air will also convey the ferric oxid dust from the chamber 5 to the dust collector 13 as before explained.

The flame or heated products of combustion in the furnace are to be applied internally and in direct contact with the ferrous sulfate being treated, the temperature of the furnace varying from the intense heat at which the calcination is effected to a cooler zone at the end where the gases escape (where the ferrous sulfate is fed into the furnace).

It is a desirable part of the process that the temperature of the furnace shall always be less than the critical temperature point at which the sulfuric acid gas is dissociated, and that the temperature of the escaping gases from the furnace shall contain sufficient heat units or of sufficiently high temperature as will prevent condensation of contained water vapor before passing through the condensing and concentrating tower.

Referring more particularly to the sulfuric acid gas recovery, the said sulfuric acid gas after leaving the furnace passes into the condensing tower 16 and flows upward through the same and between the baffles 19 and subdivided in passing through that portion 18 filled with the quartz, and during this upward passage, it is met with a downward flow of weak solution of sulfuric acid by which it is absorbed to produce an increase in the concentration of said sulfuric acid and by which it is recovered. The weak solution of the tower may be sulfuric acid of ½ or more per cent. as may be found most convenient, said degree of strength constantly varying owing to the absorption of the sulfuric acid gas and owing to the fact that the solution is used over and over again. The operation of condensation and absorption in the tower is continued until acid of the required strength is made, which may then be drawn off and stored in one of the tanks 30, while the operation is continued with acid of a weaker solution from the other tank.

The sulfurous and other gases passing through the condensing towers are treated either by contact or chamber system for the production of sulfuric acid, in the usual way, the other gases passing on unaffected.

The sludge solution may be of ordinary ferrous sulfate in solution, or may be a more concentrated form by removing part of the water to bring it with the form of "copperas" or to any intermediate degree of concentration desired. The evaporator 25 is designed to concentrate the sludge but I do not restrict myself to the use of such evaporator. If the copperas crystals are to be employed then they may be conveyed with water through the nozzle 21 into the furnace, or they may be blown in as dry crystals in pulverized condition in place of solution.

In this application I make no claim to the apparatus herein disclosed as the same is reserved for a separate application.

While I have described my process and particularized the steps therein in the preferred practice of my invention, it is to be understood that it may be varied in minor details without departing from the spirit of the invention.

Having now described my invention, what I claim as new and desire to secure by Letters Patent, is:—

1. The herein described process for the recovery of the sulfur gases from ferrous sulfate which consists in subjecting the ferrous sulfate in the form of spray to a temperature sufficient to separate therefrom the sulfur gases, and subsequently treating the sulfuric acid gas to an absorbing solution.

2. The herein described process for the recovery of the sulfur gases from ferrous sulfate which consists in subjecting the ferrous sulfate in the form of spray to a temperature sufficient to separate therefrom the sulfur gases, subsequently treating the sulfuric acid gas to an absorbing solution of weak sulfuric acid, and continuing the treatment until the solution absorbs sufficient sulfuric anhydrid to bring it to a condition of concentration suitable for commercial purposes and too strong for advantageous continued absorption of more sulfuric acid.

3. The herein described process for the recovery of the sulfur gases from ferrous sulfate which consists in subjecting the ferrous sulfate in solution to concentration, forcing it in the form of spray into a heated furnace having a temperature sufficient to separate therefrom the sulfuric acid gas, and subsequently treating the sulfuric acid gas to an absorbing solution.

4. The herein described process for the recovery of the sulfur gases from ferrous sulfate which consists in spraying the ferrous sulfate into a heated furnace and causing it to enter at the outlet and cooler end thereof and advance into a gradually hotter zone, to thereby produce fractional separation, removing the distilled sulfuric acid gas from the outlet and cooler end of the furnace causing said sulfuric acid gas to be absorbed by a suitable solution.

5. The herein described process for the recovery of the sulfur gases and ferric oxid from ferrous sulfate which consists in spraying the ferrous sulfate into a heated furnace and causing it to enter at the outlet and cooler end thereof and advance into a gradually hotter zone, to thereby produce fractional separation, removing the distilled sulfuric acid gas from the outlet and cooler end of the furnace, causing said sulfuric acid gas to be absorbed by a suitable solution, passing the ferrous oxid through the hottest zone of the furnace and oxidizing it into ferric oxid, and collecting it separate from the sulfuric acid gas.

6. The herein described process for the recovery of sulfur gases from ferrous sulfate which consists in heating a tubular furnace by admission of heating gases into one end and causing the products of combustion to escape at the other, spraying ferrous sulfate into the end of the tubular furnace from which the products of combustion escape and causing the spray to be projected against the flow of said products of combustion and so as to gradually reach a higher zone of temperature and cause distillation of sulfuric acid gas which flows off with the products of combustion, and subjecting the combined gases from the furnace to the action of a weak solution of sulfuric acid to absorb the sulfuric acid gas and separate it from the other gases.

7. The herein described process for the recovery of sulfur gases from ferrous sulfate which consists in heating a tubular furnace by admission of heating gases into one end and causing the products of combustion to escape at the other, spraying ferrous sulfate into the end of the tubular furnace from which the products of combustion escape and causing the spray to be projected against the flow of said products of combustion and so as to gradually reach a higher zone of temperature and cause separation of sulfuric acid gas which flows off with the products of combustion, subjecting the combined gases from the furnace to the action of a weak solution of sulfuric acid to absorb the sulfuric acid gas and separate it from the other gases, and causing the unabsorbed gases other than sulfur gases to be utilized for concentrating the ferrous sulfate by evaporation before being sprayed and then to pass to the atmosphere.

8. The herein described process for the recovery from ferrous sulfate material of sulfur gases and ferric oxid, which consists in spraying the ferrous sulfate material into a heated passage through which heated air is passing and thereby heating the ferrous sulfate material in subdivided form in an enveloping oxidizing atmosphere and to a temperature sufficiently high to separate the sulfur gases and to transform the ferrous oxid into ferric oxid, suitably recovering the sulfur gases, and subjecting the ferric oxid together with any associated ferrous oxid while still hot to a further treatment of oxidizing air to convert the said associated ferrous oxid into ferric oxid.

In testimony of which invention, I hereunto set my hand.

CHARLES A. WEEKS.

Witnesses:
R. M. KELLY,
E. W. SMITH.